(12) United States Patent
Takaki

(10) Patent No.: US 8,711,579 B2
(45) Date of Patent: Apr. 29, 2014

(54) SWITCHING POWER SUPPLY APPARATUS WITH OVERCURRENT LIMITING AND PROLONGED HOLDING TIME

(75) Inventor: Kazutaka Takaki, Fukushima (JP)

(73) Assignee: Sony Corporation, Tokyo (JP)

( * ) Notice: Subject to any disclaimer, the term of this patent is extended or adjusted under 35 U.S.C. 154(b) by 413 days.

(21) Appl. No.: 13/180,728

(22) Filed: Jul. 12, 2011

(65) Prior Publication Data

US 2012/0020118 A1   Jan. 26, 2012

(30) Foreign Application Priority Data

Jul. 21, 2010   (JP) .................................. 2010-163842

(51) Int. Cl.
*H02M 3/335*   (2006.01)
(52) U.S. Cl.
USPC .......................................... 363/21.01; 363/97
(58) Field of Classification Search
USPC .......... 363/21.01, 21.02, 21.04, 21.09, 21.12, 363/21.17, 97
See application file for complete search history.

(56) References Cited

U.S. PATENT DOCUMENTS

| | | | |
|---|---|---|---|
| 7,394,670 B2 * | 7/2008 | Koike ........................ | 363/21.16 |
| 2010/0008106 A1 * | 1/2010 | Kawabe et al. ............ | 363/21.01 |
| 2011/0019322 A1 * | 1/2011 | Akama ........................ | 361/93.1 |
| 2011/0122664 A1 * | 5/2011 | Yabuzaki et al. ............... | 363/53 |
| 2011/0175587 A1 * | 7/2011 | Hosotani ....................... | 323/283 |
| 2012/0020118 A1 * | 1/2012 | Takaki ............................ | 363/16 |

FOREIGN PATENT DOCUMENTS

| | | |
|---|---|---|
| JP | 7-312861 | 11/1995 |
| JP | 2002-051540 | 2/2002 |
| JP | 2004-166440 | 6/2004 |

* cited by examiner

*Primary Examiner* — Jeffrey Sterrett
(74) *Attorney, Agent, or Firm* — K&L Gates LLP

(57) ABSTRACT

A switching power supply apparatus including: a switching DC-DC converter for receiving an input voltage; a current detecting unit for detecting a current from the DC-DC converter; an input voltage detecting unit for detecting the decrease or cutoff of the input voltage; an overcurrent limiting circuit for stopping the operation of the DC-DC converter when the current detected by the current detecting unit exceeds a threshold; and a threshold control unit for changing the threshold of the overcurrent limiting circuit such that, if the decrease or cutoff of the input voltage is detected by the input voltage detecting unit, the period between the time when the decrease or cutoff of the input voltage is detected and the time when the operation of the DC-DC converter is stopped is prolonged.

6 Claims, 15 Drawing Sheets

Prior Art

Prior Art

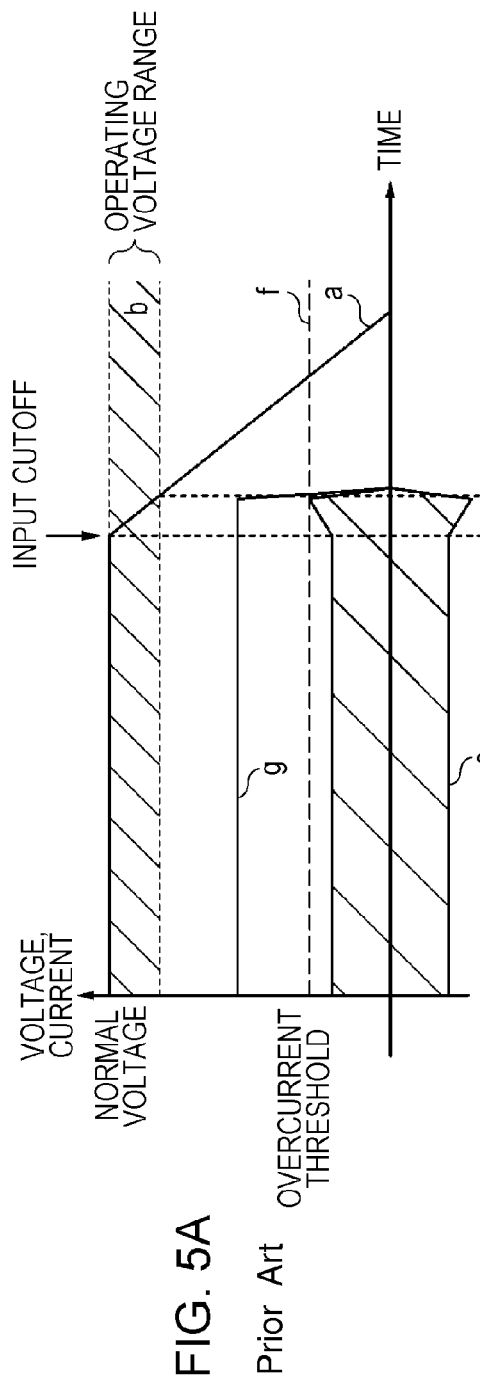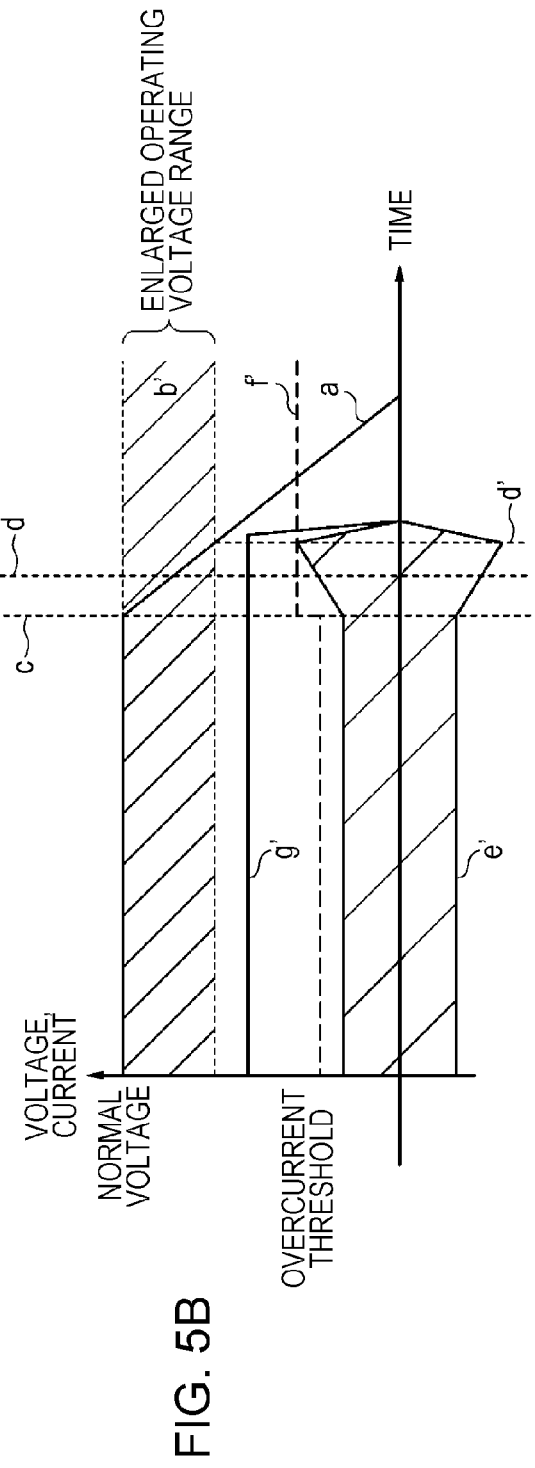

SWITCHING POWER SUPPLY APPARATUS WITH OVERCURRENT LIMITING AND PROLONGED HOLDING TIME

CROSS REFERENCES TO RELATED APPLICATIONS

The present application claims priority to Japanese Priority Patent Application JP 2010-163842 filed in the Japan Patent Office on Jul. 21, 2010, the entire contents of which is hereby incorporated by reference.

BACKGROUND

The present application relates, for example, to a switching power supply apparatus having a resonant switching converter.

Switching power supply apparatuses equipped with a variety of resonant converters are widely used.

A high power conversion efficiency can be easily achieved by a resonant converter, and a low noise characteristics can be also achieved because a switching waveform of the resonant converter is a substantially sinusoidal waveform. In addition, a resonant converter has an advantage of being configurable with a comparatively small number of components.

As a typical configuration of a resonant converter, a configuration employing a half-bridge coupling system, in which a switching circuit composed of two switching elements serially connected is disposed in parallel with a DC input voltage, is widely used. The current resonant converter employing a half-bridge coupling system is configured such that two switching elements alternately turn ON/OFF. In such a switching converter employing a half-bridge coupling system, a combination of each switching element and a resonant capacitor connected in parallel with each other is commonly in use.

Switching drive for a resonant converter is configured such that two switching elements alternately turn ON/OFF, and a transient period during which both switching elements are OFF at the same time is set. This transient period is set to prevent two switching elements from turning ON at the same time.

FIG. 1 shows an example of a switching power supply circuit that uses a current resonant converter employing a half-bridge coupling system as a DC-DC converter 4, where the half-bridge coupling system includes field-effect transistors (hereinafter referred to as FETs accordingly) Q1 and Q2 as switching elements. A commercial power supply is supplied to an AC/DC converter 3 via an AC plug 1 and a fuse 2. The AC/DC converter 3 is composed of a diode bridge BD, and a DC voltage output from the AC/DC converter 3 is supplied to a blocking capacitor (smoothing capacitor) Ci.

A voltage generated across the blocking capacitor Ci is supplied to the DC-DC converter 4 configured as a current resonant converter. In the DC-DC converter 4, a primary series resonant capacitor (hereinafter referred to as a resonant capacitor accordingly) C1 is disposed between one end of a primary coil N1 and the ground. Here, the power supply apparatus shown in FIG. 1 employs the configuration to drive the switching elements by an external excitation.

The DC-DC converter 4 shown in FIG. 1 includes a series connection circuit composed of one FET Q1 and the other FET Q2. In other words, two FETs Q1 and Q2 are coupled in a half-bridge configuration. The half-bridge circuit composed of these FET Q1 and FET Q2 is connected in parallel with a DC input voltage Vdc across the blocking capacitor Ci. Because the FET Q1 and FET Q2 are switching-driven, the DC input voltage Vdc sent to the FET Q1 and FET Q2 is switched.

In addition, a body diode D1 is connected in a so-called antiparallel state with the FET Q1. In other words, the drain of the FET Q1 is connected with the cathode of the body diode D1, and the source of the FET Q1 is connected with the anode of the body diode D1 so that the forward direction of the FET Q1 and the forward direction the body diode are reversed. In a similar way, a body diode D2 is connected in an antiparallel state with the FET Q2. A series resonant circuit, which is composed of a primary coil N1 of a transformer T, a leakage inductance component L1 of the transformer T, and a resonant capacitor C1, is connected in parallel with the FET Q2.

On the other hand, a resonant capacitor is not connected with the FET Q1. However, as is generally familiar, a resonant operation of the configuration with a resonant capacitor connected in parallel with the FET Q2 and without any resonant capacitor connected in parallel with the FET Q1 is similar to that of the configuration with two resonant capacitors connected in parallel with the FET Q1 and FET Q2 respectively.

A control circuit 9 is provided for switching-driving the FET Q1 and FET Q2 by an external excitation, and includes, for example, an oscillator 10 and a drive circuit 11 as shown in FIG. 1. The oscillator 10 generates an oscillating signal with a predefined frequency, and supplies the oscillating signal to the drive circuit 11. The drive circuit 11 generates drive signals SG1 and SG2 for switching-driving the FET Q1 and FET Q2 with the use of the input oscillating signal.

The frequencies of these drive signals SG1 and SG2 are determined on the basis of the output signal of the oscillator 10 input to the drive circuit 11. In addition, there is a phase difference of 180 degrees between the phase of the drive signal SG1 and that of the drive signal SG2. Therefore, the FET Q1 and FET Q2 perform a switching operation in such a way that they turn ON/OFF alternately in accordance with a switching frequency determined by the oscillating signal frequency generated by the oscillating circuit 11.

In addition, the waveforms of the drive signals SG1 and SG2 are formed in such a way that a transient period during which both FET Q1 and FET Q2 are OFF at the same time is set. The control circuit 9 also includes an error amplifier 12 and a photocoupler 13.

The transformer T is provided for transmitting a switching output of the FET Q1 and FET Q2 from the primary side to the secondary side, and is fabricated by winding a primary coil N1 and a secondary coil N2 around a core. In addition, the leakage inductance component L1 contributes to a resonant operation. One end part of the primary coil N1 is connected with the connection node between the FET Q1 and FET Q2, and the other end part is connected with the negative side of the DC input voltage Vdc via the series resonant capacitor C1.

Here, the leakage inductance component L1 is connected in series with the resonant capacitor C1, and this series connection of L1 and C1 forms a primary side series resonant circuit. The switching output of the FET Q1 and FET Q2 is supplied to the primary side series resonant circuit, which makes the switching operation of the primary side series resonant circuit a current resonant operation.

On the secondary side of the transformer T, the center tap formed at the center point of the secondary coil N2 is connected with the secondary side ground. In addition, rectifier diodes D3 and D4, and a smoothing capacitor Co connected as shown in FIG. 1 form a secondary side full-wave rectifier. An alternating voltage excited on the secondary coil N2 is rectified and smoothed by this secondary side full-wave rectifier. A secondary side DC voltage Vout is generated as a voltage across the smoothing capacitor Co, and supplied to a load.

In addition, the secondary side DC voltage Vout is branched and supplied to the error amplifier 12 in the control circuit 9. In the error amplifier 12, the level of the secondary side DC voltage Vout and the predefined level of a reference voltage Vref are compared with each other, and an error signal having the level corresponding to an error between two levels is generated and supplied to the oscillator 10 via a photocoupler 13. The photocoupler 13 is provided for isolating the primary side from the secondary side in order to accurately feed back the error signal from the secondary side to the oscillator 10 that is supposed to be disposed on the primary side. A resistor Ro is disposed to adjust a current to be injected into a photodiode in the photocoupler 13 in accordance with the error signal.

The oscillator 10 is a variable-frequency oscillator that changes its oscillating frequency in accordance with the error signal. The amount of energy transmitted from the primary side to the secondary side changes as the switching frequency of the FET Q1 and FET Q2 changes, with the result that the level of the secondary side DC voltage Vout is variably controlled. As a result, the secondary side DC output voltage can be stabilized by the above-described control system.

To put it concretely, the stabilization control works such that the switching frequency is made low when the level of the secondary side DC voltage Vout lowers. As a result, the amount of energy transmitted to the secondary side increases and the secondary side DC voltage Vout rises. When the level of the secondary side DC voltage Vout rises, the switching frequency is made high, with the result that the amount of energy transmitted to the secondary side decreases and the secondary side DC voltage Vout lowers. Alternatively, in stead of the oscillator 10, a pulse-width modulation circuit can be used to stabilize the output voltage by changing the pulse width of its output pulse.

FIG. 2 shows a circuit including the FET Q1 and FET Q2 as a part of the entire circuit shown in FIG. 1. FIG. 3 shows the waveforms of the drive signals SG1 and SG2, the waveforms of the currents IQ1, IQ2, and IL, and the waveform of the voltage VC1 across the resonant capacitor C1 at the time when the power supply for the switching power supply circuit is in a stable state (or when the switching power supply circuit is in a normal operation state). Here, the currents IQ1 and IQ2 represent currents that flow through the FET Q1 and FET Q2 respectively, and the current IL represents a current that flows through the resonant circuit.

The drive circuit 11 supplies the drive signals SG1 and SG2 to the gates of the FET Q1 and FET Q2 respectively as shown in FIG. 3A and FIG. 3B. The FET Q1 is ON during the time period when the drive signal SG1 is in the high level of a positive polar pulse, and the FET Q1 is OFF during the time period when the drive signal SG1 is in the low level. The same is equally true of the FET Q2 and the drive signal SG2.

The operation of the above circuit including the FET Q1 and FET Q2, which is in a normal operation state, will be described below. Firstly, at the start of the time period t1, because the drive signal SG1 becomes in the high level, the FET Q1 becomes ON, and the current IQ1 flows through a route from Q1, L1, and N1 to C1 as shown in FIG. 3C.

In the transient time period t2, the drive signal SG1 is in the low level, so both FET Q1 and FET Q2 are OFF. In this case, the IQ2 shown in FIG. 3D transiently flows through a route from D2, L1, and N1 to C1 in order to hold a resonant state formed by the leakage inductance component L1 and the resonant capacitor C1.

At the start of the time period t3, because the drive signal SG2 becomes in the high level, the FET Q2 becomes ON. In this instance, because the resonant state formed by the leakage inductance component L1 and the resonant capacitor C1 has been continued, the current IQ2 flows through a route from D2, L1, and N1 to C1 and a route from Q2, L1, and N1 to C1. However, owing to the resonance state formed by the leakage inductance component L1 and the resonant capacitor C1, the current IQ2 begins to flow reversely through a route from C1, N1, and L1 to Q2 over time.

The time period t4 is a transient time period, in which the drive signal SG2 is in the low level, so the FET Q2 is OFF. Because the FET Q1 is also OFF, the IQ1 flows through a route from C1, N1, and L1 to Q1 as shown in FIG. 3C. After the time period t4 is over, the operation of the circuit again returns to that in the time period t1.

The above-described switching power supply circuit is equipped with an overcurrent limiting circuit for protecting a power supply circuit or a load circuit. When an overcurrent is detected, the overcurrent limiting circuit stops the operation of the converter circuit.

FIG. 4 shows an example of a switching power supply circuit equipped with an overcurrent limiting circuit. The leakage inductance component L1, the output side smoothing capacitor Co, the load, the feedback loop, and the like in FIG. 1 are not shown in FIG. 4. In FIG. 5 and later figures, the above elements are not shown as well. The overcurrent limiting circuit 6 includes a comparator 6a.

A current that flows the primary side of the transformer T is detected at a current detecting point 5, for example, as a voltage. The obtained voltage is sent to the comparator 6a, and is compared with the voltage value of a DC voltage supply 6b. When an overcurrent is detected, the detected voltage exceeds the voltage value of the DC voltage supply 6b, and the polarity of the output of the comparator 6a is reversed. The operation of the DC-DC converter 4 is stopped by the output of the comparator 6a. To put it concretely, the switching operation of the FET Q1 and FET Q2 is stopped. As a result, the output power supply to the load is cut off.

It is necessary for the switching power supply circuit to continue to supply power to the load as long as possible in the case where the voltage on the input side of the power supply circuit is lowered or cut off. The time during which the power supply circuit can continue to supply power after the input to the power supply circuit is cut off is called a holding time. The longer the holding time is, at the easier pace the load circuit can perform termination processing. Therefore, the longer the holding time is, the more desirable it is. For example, let's suppose that it takes about 20 ms the load circuit to detect the cutoff of the input, and it also takes about 20 ms the load circuit to transfer information from a volatile memory to an nonvolatile memory. In this case, it is necessary for the holding time to be more than 40 ms.

In the case where the input is cut off, power continues to be supplied to the load circuit by energy stored inside the power supply circuit. The energy inside the power supply circuit is stored in the blocking capacitor Ci. The terminal voltage across the capacitor Ci decreases as part of the energy stored in the capacitor Ci is pulled out. Therefore, in order for a constant amount of energy to be pulled out, it is necessary to take more current out from the capacitor Ci when taking the equation "current=power/voltage" into consideration as the voltage across the capacitor Ci decreases.

In an existing power supply circuit, because the overcurrent limiting circuit 6 operates as described above, the operation of the DC-Dc converter 4 is stopped. As a result, the operation of the power supply circuit is stopped, and the power supply to the load circuit is cut off. As described above, there is a problem in that it may be difficult to prolong the holding time owing to the stoppage of the overcurrent limiting circuit 6.

Techniques to change the threshold of the overcurrent limiting circuit are disclosed in Japanese Unexamined Patent Application Publication 07-312861, Japanese Unexamined Patent Application Publication 2004-166440, and Japanese Unexamined Patent Application Publication 2002-51540.

SUMMARY

The technique disclosed in Japanese Unexamined Patent Application Publication 07-312861 is used for holding the output voltage of a switching power supply apparatus in a normal operation constant, and its primary objective is to deduce the power consumption of an input voltage detecting circuit. A primary objective of the technique disclosed in Japanese Unexamined Patent Application Publication 2004-166440 is to make full use of the capability of a power factor improvement circuit. A primary objective of the technique disclosed in Japanese Unexamined Patent Application Publication 2002-51540 is to improve efficiency. Therefore, it is difficult to prolong a holding time with the use of the contents disclosed in these unexamined patent application publications.

Therefore, according to an embodiment, there is provided a switching power supply apparatus that can prolong the holding time even if the apparatus is equipped with an overcurrent limiting circuit.

A switching power supply apparatus according to an embodiment includes: a switching DC-DC converter for receiving an input voltage; a current detecting unit for detecting a current from the DC-DC converter; an input voltage detecting unit for detecting the decrease or cutoff of the input voltage; an overcurrent limiting circuit for stopping the operation of the DC-DC converter when the current detected by the current detecting unit exceeds a threshold; and a threshold control unit for changing the threshold of the overcurrent limiting circuit such that, if the decrease or cutoff of the input voltage is detected by the input voltage detecting unit, the period between the time when the decrease or cutoff of the input voltage is detected and the time when the operation of the DC-DC converter is stopped is prolonged.

A first embodiment further includes an AC/DC converter in front of the DC-DC converter, in which the input voltage detecting unit detects the decrease or cutoff of an AC voltage supplied to the AC/DC converter.

A second embodiment further includes a smoothing capacitor in front of the DC-DC converter, in which the input voltage detecting unit detects the decrease or cutoff of a terminal voltage across the smoothing capacitor.

According to the embodiments, the holding time can be prolonged, thereby a load circuit can perform termination processing at an easier pace.

Additional features and advantages are described herein, and will be apparent from the following Detailed Description and the figures.

BRIEF DESCRIPTION OF THE FIGURES

FIG. 5A and FIG. 5B are conceptual diagrams showing advantages and disadvantages between the existing apparatus and an apparatus according to the present application in comparison;

DETAILED DESCRIPTION

Figure 1:
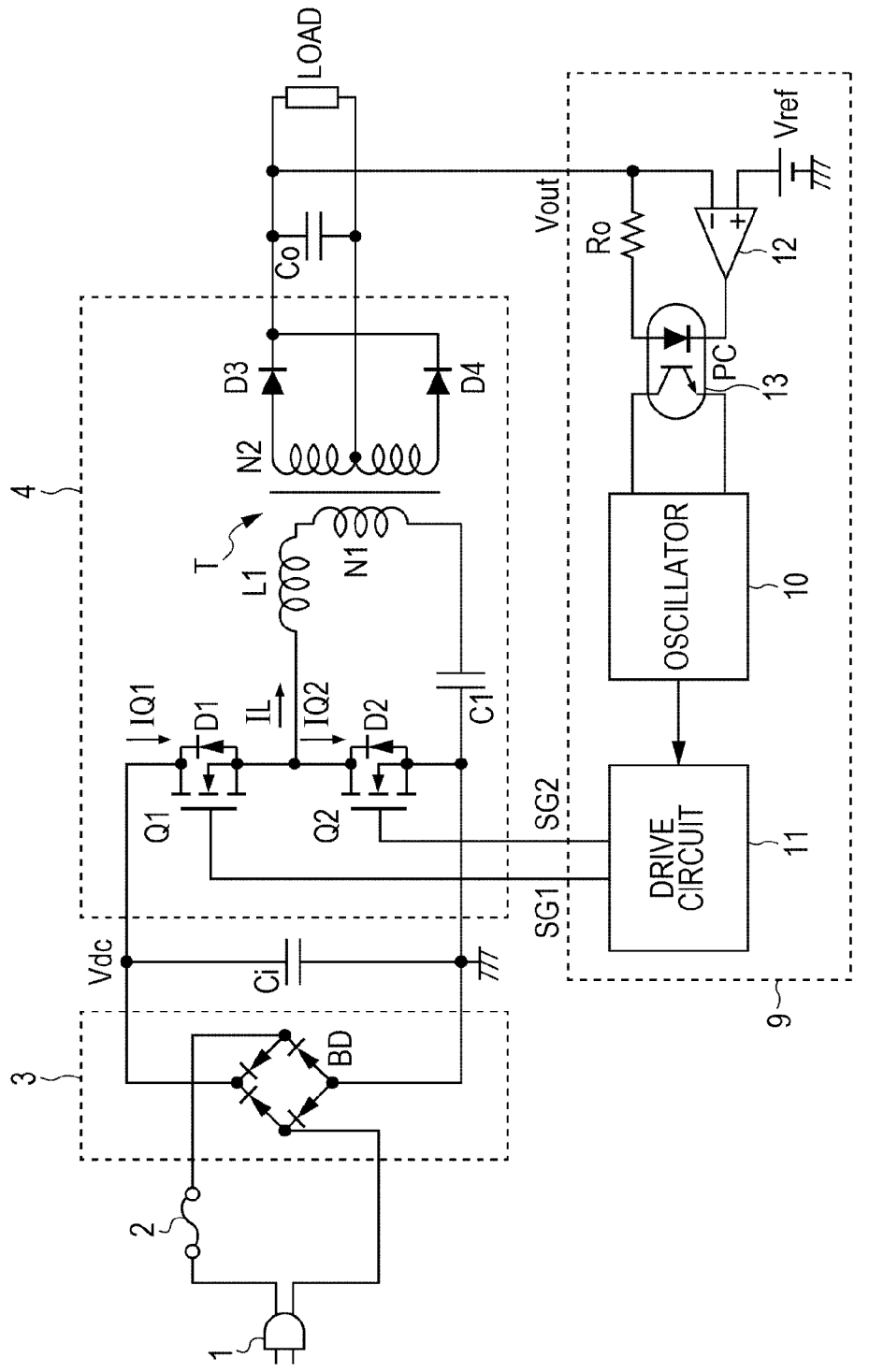
FIG. 1 is a circuit diagram showing the configuration of an existing switching power supply apparatus.
Figure 2:
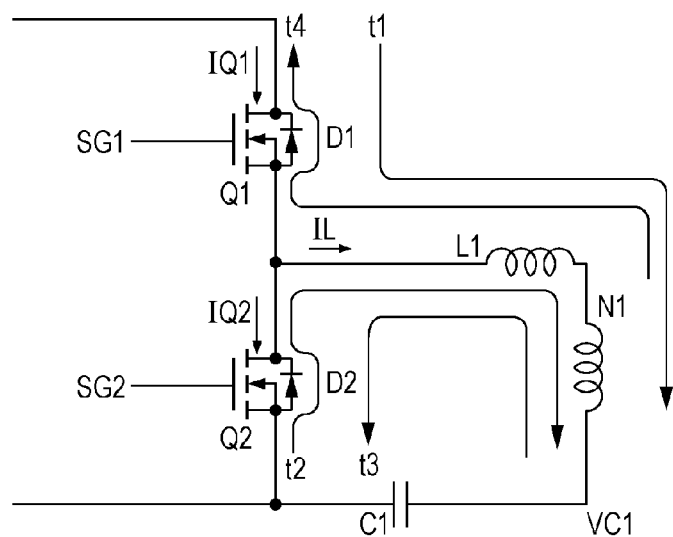
FIG. 2 is a circuit diagram used for describing the operation of the existing switching power supply apparatus.
Figure 3:
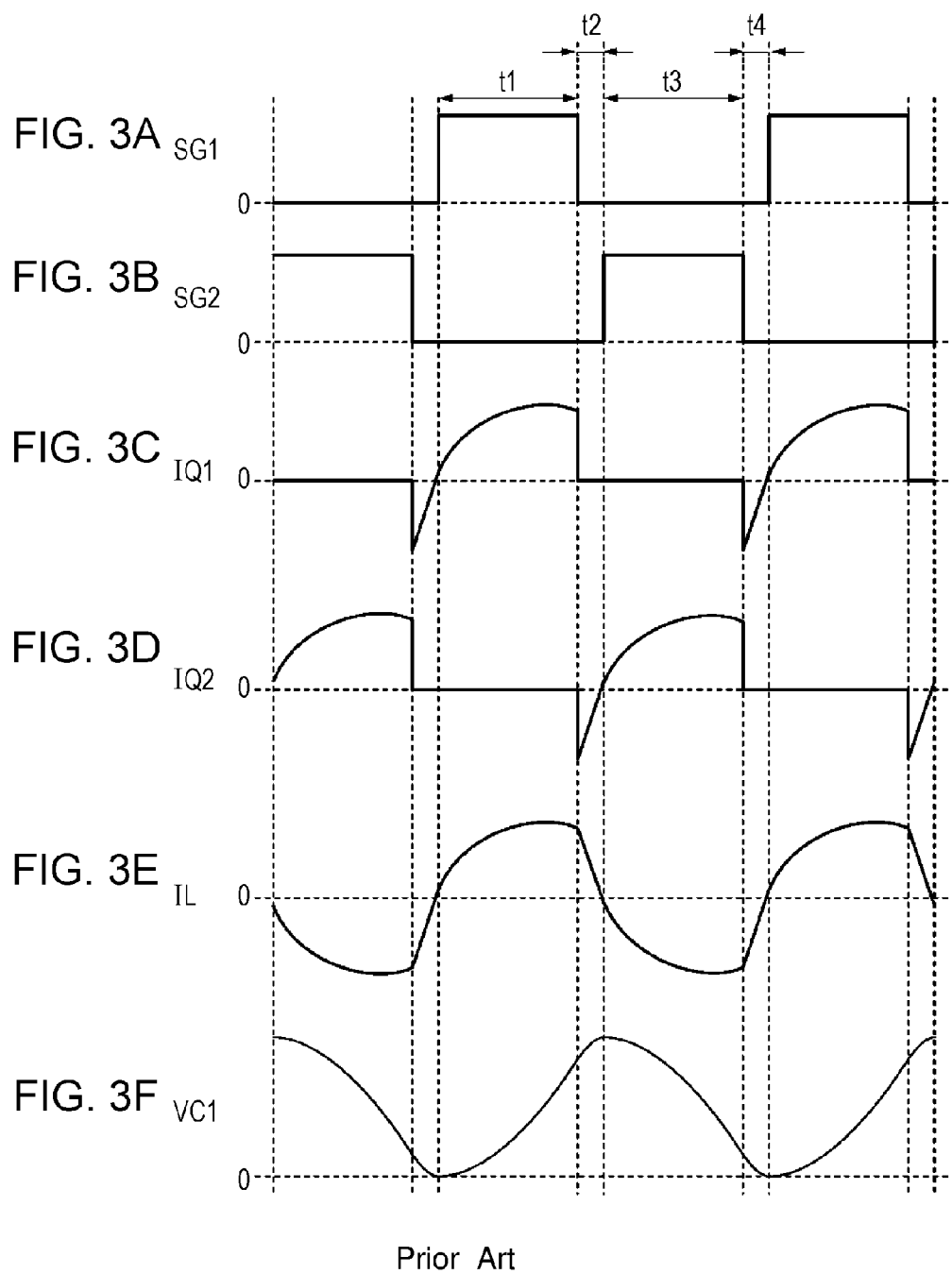
FIG. 3A to FIG. 3F are waveform charts showing signal waveforms of several parts of the existing switching power supply apparatus when the apparatus is in operation.

Embodiments of the present application will be described below in detail with reference to the drawings.
1. Advantages
2. First Embodiment
3. Second Embodiment
4. Third Embodiment
5. Modifications Although embodiments that will be described hereinafter are preferable embodiments, and a variety of technologically preferable limitations are put on these embodiments, it should be understood that the breadth and scope should not be limited by any of the following embodiments unless any limitations on the present application are expressly stated in the following descriptions.

1. Advantages

Advantages are as follows:

the apparatus according to the present application detects the decrease or cutoff of an input voltage through directly monitoring the input voltage or through detecting the decrease of a voltage across a blocking capacitor, and changes a threshold, which is used when an overcurrent limiting circuit operates, within a range where the operations of circuits of the apparatus and a load are not adversely affected by changing the threshold. By changing the threshold, it becomes possible to take more current out. By taking more current out, it becomes possible to prolong a holding time of output even if a voltage across the blocking capacitor Ci decreases.

An advantage to prolong the holding time of output will be described with reference to FIG. 5A and FIG. 5B. FIG. 5A shows the operation of an existing apparatus equipped with an existing overcurrent limiting circuit, and FIG. 5B shows the operation of an embodiment according to the present application. In FIG. 5A, a voltage change a shows a terminal voltage across the blocking capacitor Ci, that is, the input voltage to the DC-DC converter 4; b represents an operating voltage range; c represents a time at which the input voltage is cut off; d represents a limiting time until which the output voltage is held; e represents the change of a current that flows the primary side of the transformer T; f represents the overcurrent threshold; and g represents the output voltage. Although the current is really vibratory, e in FIG. 5A shows the envelope of the current. In FIG. 5B, a, b', c, d', e', f, and g' are respectively the counterparts of a, b, c, d, e, f, and g in FIG. 5A. A voltage change and a time at which the input voltage is cut off in FIG. 5B is the same as those in FIG. 5A, thereby the same alphabets are given.

As shown in FIG. 5A and FIG. 5B, when the input is cut off at the time c, the voltages e and e' begin to decrease. In FIG. 5A, in order to hold the output voltage g for supplying a constant output power to a load, the current e begins to increase. The same is true of the relationship between e' and g' in FIG. 5B. As shown in FIG. 5A, the current e becomes larger than the threshold f of the overcurrent limiting circuit at the time d, thereby the operation of the DC-DC converter 4 is stopped by the overcurrent limiting circuit 6. Because of the stoppage of the DC-DC converter 4, the output voltage a decreases. As a result, a voltage range within which the existing apparatus can be in operation becomes a range shown by b in FIG. 5A, thereby the holding time of output is the difference between the time c and the time d.

In the embodiment, as shown in FIG. 5B, the overcurrent threshold f is set to be higher than f at the time c at which the input voltage is cut off. As a result, the time at which the current e' becomes larger than the threshold f becomes d'. Because the time d' comes in later than the time d, a voltage range within which the apparatus according to this embodiment can be in operation is enlarged from b to b', thereby the holding time of output becomes the difference between the time c and the time d'. The difference between the time c and the time d' is larger than the difference between the time c and the time d, thereby the holding time of output is enlarged in this embodiment.

The size of circuit components for the overcurrent limiting circuit used in the apparatus according to the embodiment is small, thereby these components can be easily added to an existing integrated circuit. In addition, because the holding time can be prolonged, the capacity of the blocking capacitor can be made small. Because a small-sized capacitor with a small capacity can be used as the blocking capacitor, mechanical limitation on the design of a power supply circuit is alleviated, with the result that the power supply circuit can be downsized.

Figure 6:
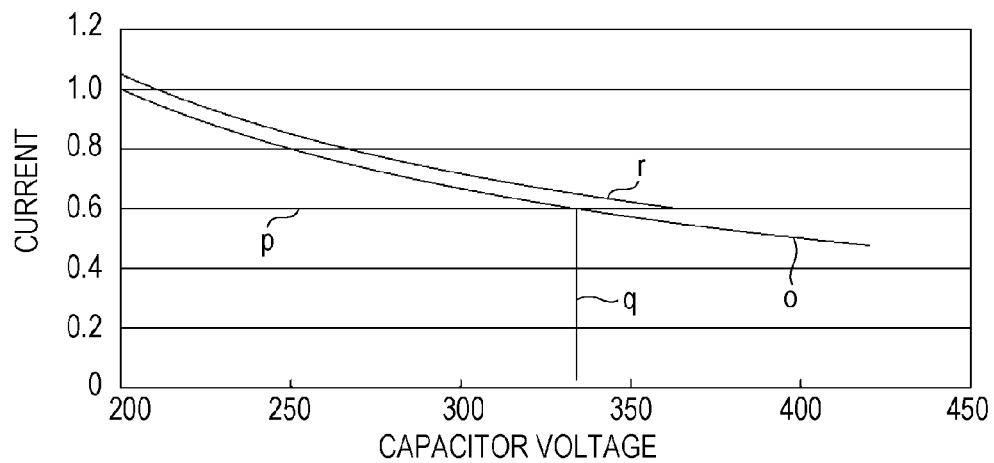
FIG. 6 is a conceptual diagram showing an example of threshold control.

The threshold can be changed not only stepwise, but also in a curved line as shown in FIG. 6. For example, if the output power is constant, the relationship between a capacitor voltage (in the x-axis) and a current (in the y-axis) is shown by a curve o in FIG. 6. Because an overcurrent threshold p used in the existing apparatus is constant, overcurrent limiting operation works at a point where the current exceeds the threshold p (shown by q). Therefore, the existing apparatus does not operates with the capacitor voltage equal to or smaller than the voltage value corresponding to this point. On the other hand, by changing the threshold r in a curved line in accordance with the current o, it can be realized to make the current not to exceed the threshold r in a range within which the existing apparatus can normally operate.

Figure 7:
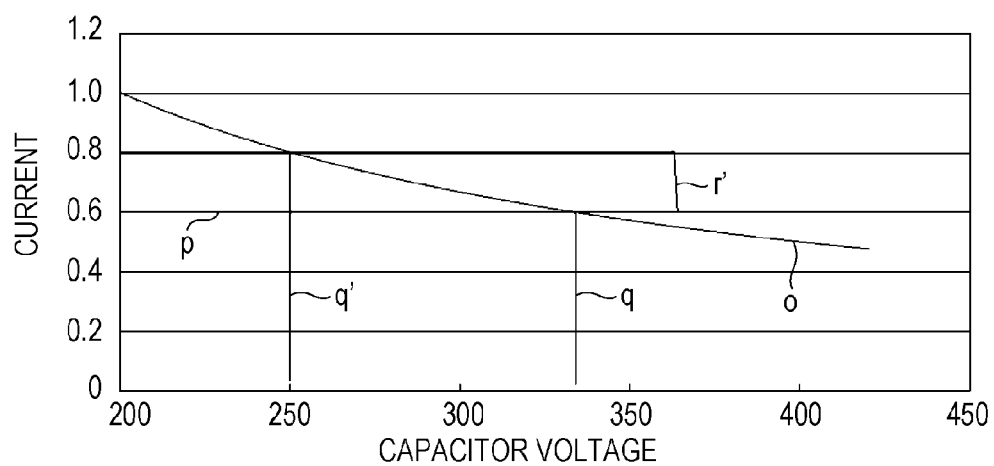
FIG. 7 is a conceptual diagram showing another example of threshold control.

FIG. 7 shows a configuration that the threshold is changed in two steps. The overcurrent threshold used in the existing apparatus is constant as shown by p. On the other hand, a threshold r', which is changed in two steps such that its value is high within a range where the capacitor voltage is low, and low within a range where the capacitor voltage is high, is used in the apparatus according to the embodiment. By using such a threshold r', it becomes possible that a DC-DC converter operates until the capacitor voltage becomes low to a point shown by q'.

2. First Embodiment

A first embodiment will be described hereinafter with reference to the attached drawings. In the first embodiment, a switching power supply apparatus detects the decrease or cutoff of an input voltage, and changes a threshold, which is used when an overcurrent limiting circuit operates, within a range where the operations of circuits of the apparatus and a load are not adversely affected by changing the threshold. In this case, by changing the threshold as described above, it become possible to take more current out. By taking more current out, it becomes possible to prolong the holding time of output even if a voltage across the blocking capacitor Ci decreases. Let's refer to such a method according to the first embodiment as an input voltage detecting method.

Figure 8:
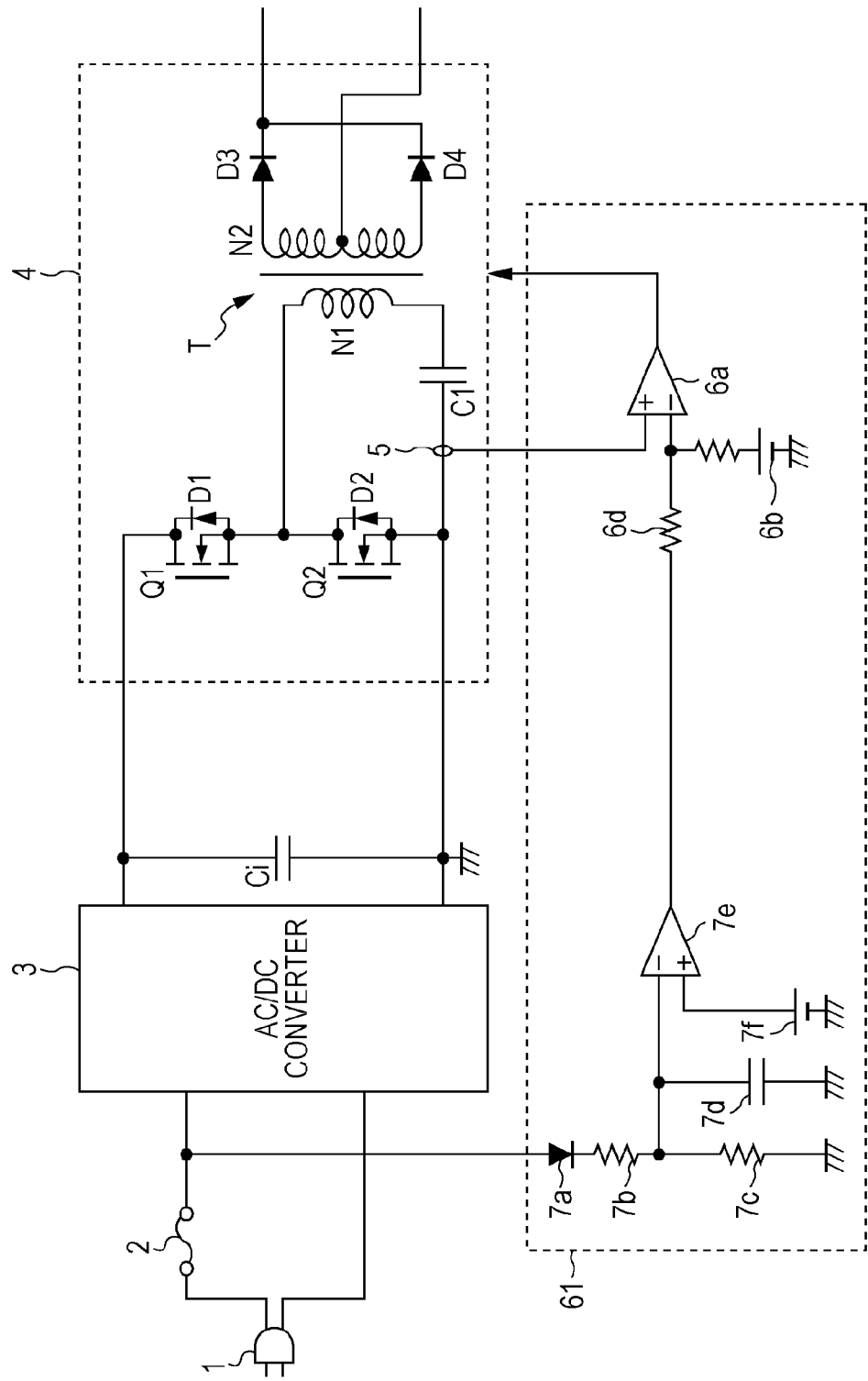
FIG. 8 is a circuit diagram showing a first example of a first embodiment.

"First Example of Input Voltage Detecting Method" FIG. 8 shows a first example of the overcurrent limiting circuit according to the input voltage detecting method. The configuration shown in FIG. 8 is the same as that shown in FIG. 4 except for the configuration of an overcurrent limiting circuit 61. In FIG. 8, an AC voltage on the input side of an AC/DC converter 3 is supplied to the anode of a diode 7a, and the cathode of the diode 7a is connected with the ground via resisters 7b and 7c. A capacitor 7d is connected in parallel with the resister 7c. The rectified voltage of the input AC voltage is generated at the connection node between a resistor 7b and a resistor 7c.

The rectified voltage is supplied to a comparator 7e, and is compared with a DC voltage source 7f (a threshold 7f) by the comparator 7e. The output of the comparator 7e becomes at a high level ("at a high level" will be hereinafter abbreviated to "H" accordingly) when a voltage applied to the (+) input (hereinafter referred to as Vin+) of the comparator 7e is larger than a voltage applied to the (−) input (hereinafter referred to as Vin−) of the comparator 7e, and becomes at a low level ("at a low level" will be hereinafter abbreviated to "L" accordingly) when Vin− is larger than Vin+. In a normal operation state in which the input AC voltage is supplied, Vin− of the comparator 7e is larger than Vin+, therefore the output becomes L.

The output voltage of the comparator 7e is supplied to the (−) input of a comparator 6a via a resistor 6d. A series circuit composed of a resistor 6c and a DC voltage supply 6b is connected between the (−) input of the comparator 6a and the ground. When the output of the comparator 7e is L, a threshold determined by the DC voltage supply 6b, the resister 6c, and the resister 6d is supplied to the (−) input of the comparator 6a.

In this state, if a voltage obtained by converting a current detected at a current detecting point 5 exceeds the threshold, the output of the comparator 6a becomes H. Although not shown in FIG. 8, the output of the comparator 6a is supplied to an oscillator, a PMW modulator, and the like of a DC-DC converter 4, and when the output of the comparator 6a becomes H, the switching operation of FETs Q1 and Q2 is stopped. In other words, the operation of the DC-DC converter 4 is stopped and overcurrent limiting operation is performed.

If the input AC voltage is decreased or cut off, Vin− that is supplied to the comparator 7e is decreased or becomes 0 volt, with the result that Vin+ becomes larger than Vin−, and the output of the comparator 7e becomes H. Therefore, the threshold for the comparator 6e becomes higher than when the output of the comparator 7e is L. As a result, if the input AC voltage is decreased or cut off, the threshold for the overcurrent limiting circuit 61 becomes higher, and the holding time of output can be prolonged.

"Second Example of Input Voltage Detecting Method"

Figure 9:
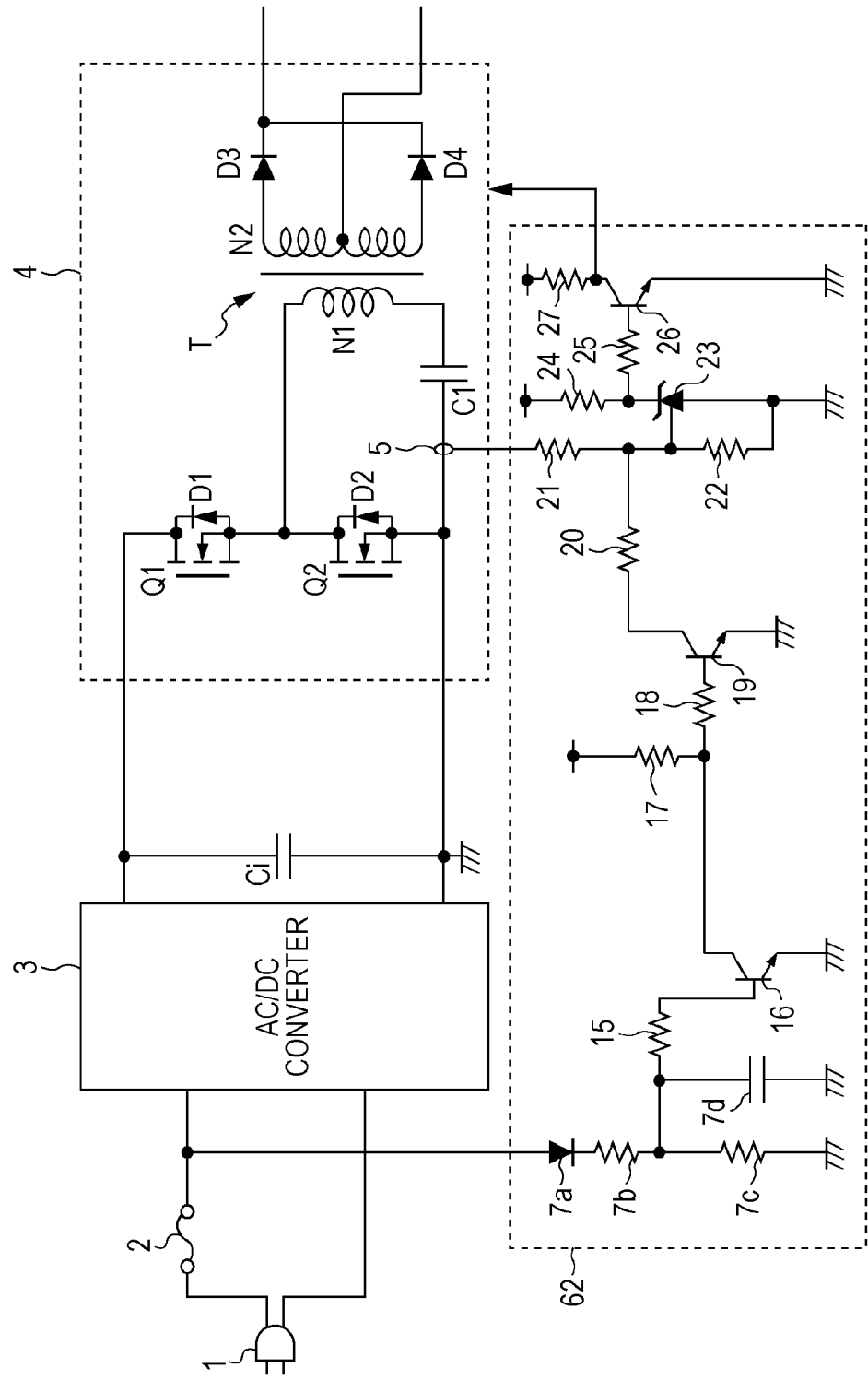
FIG. 9 is a circuit diagram showing a second example of the first embodiment.

FIG. 9 shows a second example of the overcurrent limiting circuit according to the input voltage detecting method. The configuration shown in FIG. 9 is the same as that shown in FIG. 4 except for the configuration of an overcurrent limiting circuit 62. The rectified output of an AC voltage on the input side of the AC/DC converter 3 is sent to the base of an NPN transistor 16 via a resistor 15. The emitter of the transistor 16 is earthed, and the collector of the transistor 16 is connected with a positive DC voltage supply line via a resistor 17. In addition, the collector of the transistor 16 is connected with the base of an NPN transistor 19 via a resistor 18. The emitter of the transistor 19 is earthed, and the collector of the transistor 19 is connected with the connection node between a resistor 21 and a resistor 22 via a resistor 20.

A series circuit of the resistor 21 and the resistor 22 is disposed between a current detecting point 5 and the ground. A voltage generated at the connection node between the resistor 21 and the resistor 22 is supplied to a reference terminal of a shut regulator 23. The anode of the shunt regulator 23 is earthed, and the cathode of the shunt regulator 23 is connected with a positive DC voltage supply line via a resistor 24. In addition, the cathode of the shunt regulator 23 is connected with the base of an NPN transistor 26 via a resistor 25.

The emitter of a transistor 26 is earthed, and the collector of the transistor 26 is connected with a positive DC voltage supply line via a resistor 27. The operation of a DC-DC converter 4 is controlled by an output generated at the collector of the transistor 26. The operation of a DC-DC converter 4 is controlled in such a way that, if the output of the transistor 26 is H, the operation of the DC-DC converter 4 is stopped.

The operation of the second example of the overcurrent limiting circuit will be described below. In a normal operation state in which the input AC voltage is supplied, the transistor 16 is ON owing to the rectified output of the AC voltage, and the collector of the transistor 16 is L. Therefore the transistor 19 becomes OFF. Therefore, the connection node between the resistors 21 and 22 becomes in a state similar to that in which the connection node is not connected with the transistor 19 via the resistor 20.

A voltage obtained by dividing a voltage, which is obtained by converting a current detected at the current detecting point 5, by the resistor 21 and resistor 22 is supplied to the reference terminal of the shunt regulator 23. The voltage supplied to the reference terminal, that is, the voltage at the connection node between the resistor 21 and resistor 22, is compared with a reference voltage (equivalent to a threshold) embedded in the shunt regulator 23, and a current corresponding to the difference between the above two voltages flows between the anode and the cathode of the shunt regulator 23.

In the normal operation state, the voltage at the connection node between the resistor 21 and resistor 22 is lower than the reference voltage of the shunt regulator, and no current flows through the shunt regulator 23. Therefore, the transistor 26 becomes ON, and the collector of the transistor 26 becomes L. In this case, overcurrent limiting operation is not performed. When a voltage obtained by converting a current detected at the current detecting point 5 becomes large, and the voltage at the connection node between the resistor 21 and resistor 22 becomes higher than the reference voltage of the shunt regulator 23, a current flows through the shunt regulator 23, thereby the transistor 26 become OFF. As a result, the collector of the transistor 26 becomes H, and the operation of the DC-DC converter 4 is stopped. In other words, the overcurrent limiting operation is performed.

In a state in which the input voltage is neither decreased nor cut off, the transistor 16 is ON, and the transistor 19 is OFF, thereby the connection node between the resistors 21 and 22 becomes in a state similar to that in which the transistor 19 is not connected. On the other hand, if the input voltage is decreased or cut off, the transistor 16 becomes OFF, and the transistor 19 becomes ON, thereby the resistor 20 is equivalently connected in parallel with the resistor 22. As a result, because a branch path is formed by the resistor R20, the voltage at the connection node between the resistor 21 and resistor 22 becomes lower.

As described above, if the decrease or cutoff of the input voltage is generated, the input voltage to the shunt regulator 23 is lowered. This is equivalent to increasing the reference voltage (threshold) of the shunt regulator 23. Therefore, if the decrease or cutoff of the input voltage is generated, the holding time can be prolonged.

"Third Example of Input Voltage Detecting Method"

Figure 10:
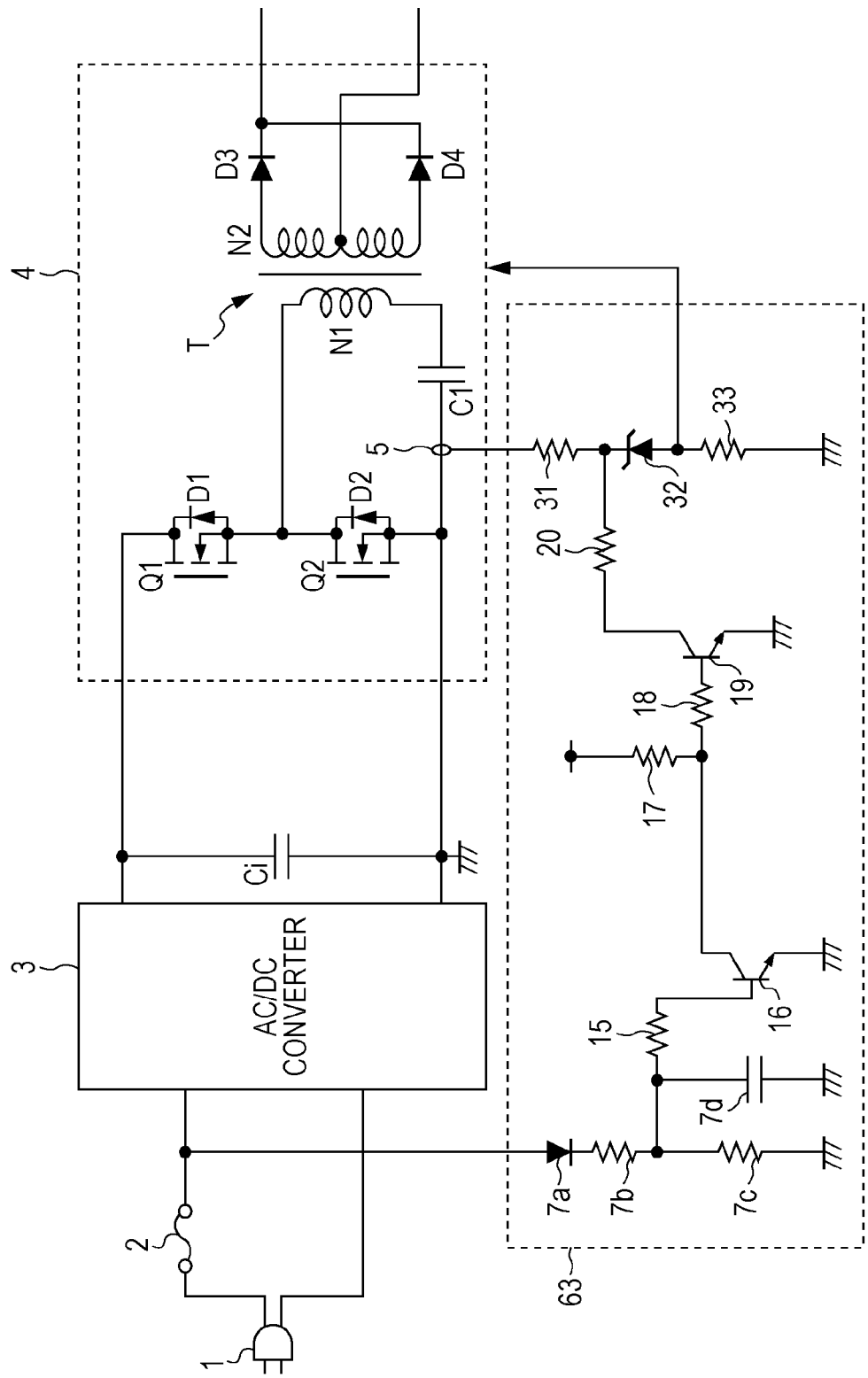
FIG. 10 is a circuit diagram showing a third example of the first embodiment.

FIG. 10 shows a third example of the overcurrent limiting circuit according to the input voltage detecting method. The configuration shown in FIG. 10 is the same as that shown in FIG. 4 except for the configuration of an overcurrent limiting circuit 63. The rectified output of an AC voltage on the input side of the AC/DC converter 3 is sent to the base of an NPN transistor 16 via a resistor 15. The emitter of the transistor 16 is earthed, and the collector of the transistor 16 is connected with a positive DC voltage supply line via a resistor 17. In addition, the collector of the transistor 16 is connected with the base of an NPN transistor 19 via a resistor 18. The emitter of a transistor 19 is earthed.

The third example of the overcurrent limiting circuit is equipped with a zener diode 32. The cathode of the zener diode 32 is connected with a current detecting point 5, and the anode of the zener diode 32 is connected with the ground via a resistor 33. The connection node between the resistor 31 and the cathode of the zener diode 32 is connected with the collector of the transistor via the resistor 20. A control signal for controlling the operation of a DC-DC converter 4 is taken out from the connection node between the anode of the zener diode 32 and the resistor 33.

The operation of the third example of the overcurrent limiting circuit will be described below. In a normal operation state in which the input AC voltage is supplied, the transistor 16 is ON owing to the rectified output of the AC voltage, and the transistor 19 becomes OFF. Therefore, the connection node between the resistor 31 and the cathode of the zener diode 32 becomes in a state similar to that in which the connection node is not connected with the transistor 19 via the resistor 20.

When a voltage obtained by converting a current detected at a detecting point 5 does not exceed the zener voltage (threshold) of the zener diode 32, no current flows through the zener diode 32. Therefore, a voltage across the resistor 33 is low, so that a control output becomes L. In other words, the operation of the DC-DC converter 4 is not stopped. If the voltage obtained by converting the current detected at the current detecting point 5 exceeds the zener voltage (threshold) of the zener diode 32, the control signal becomes H, and the operation of the DC-DC converter 4 is stopped. In other words, overcurrent limiting operation is performed.

If the input voltage is decreased or cut off, the transistor 16 becomes OFF, and the transistor 19 becomes ON, thereby a branch path is formed by the resistor R20, and the voltage applied to the zener diode 32 is lowered.

As described above, owing to the decrease or cutoff of the input voltage, the input voltage to the zener diode 32 is lowered. This is equivalent to increasing the zener voltage (threshold) of the zener diode 32. Therefore, if the decrease or cutoff of the input voltage is generated, the holding time can be prolonged.

3. Second Embodiment

A second embodiment will be described hereinafter with reference to the attached drawings. In the second embodiment, a switching power supply apparatus detects the decrease or cutoff of an input voltage by monitoring a voltage across a blocking capacitor, and changes a threshold, which is used when an overcurrent limiting circuit operates, within a range where the operations of circuits of the apparatus and a load are not adversely affected by changing the threshold. In this case, by changing the threshold as described above, it become possible to take more current out. By taking more current out, it becomes possible to prolong the holding time of output even if a voltage across the blocking capacitor Ci decreases. Let's refer to such a method according to the second embodiment as a blocking capacitor voltage detecting method.

"First Example of Blocking Capacitor Voltage Detecting Method"

Figure 11:
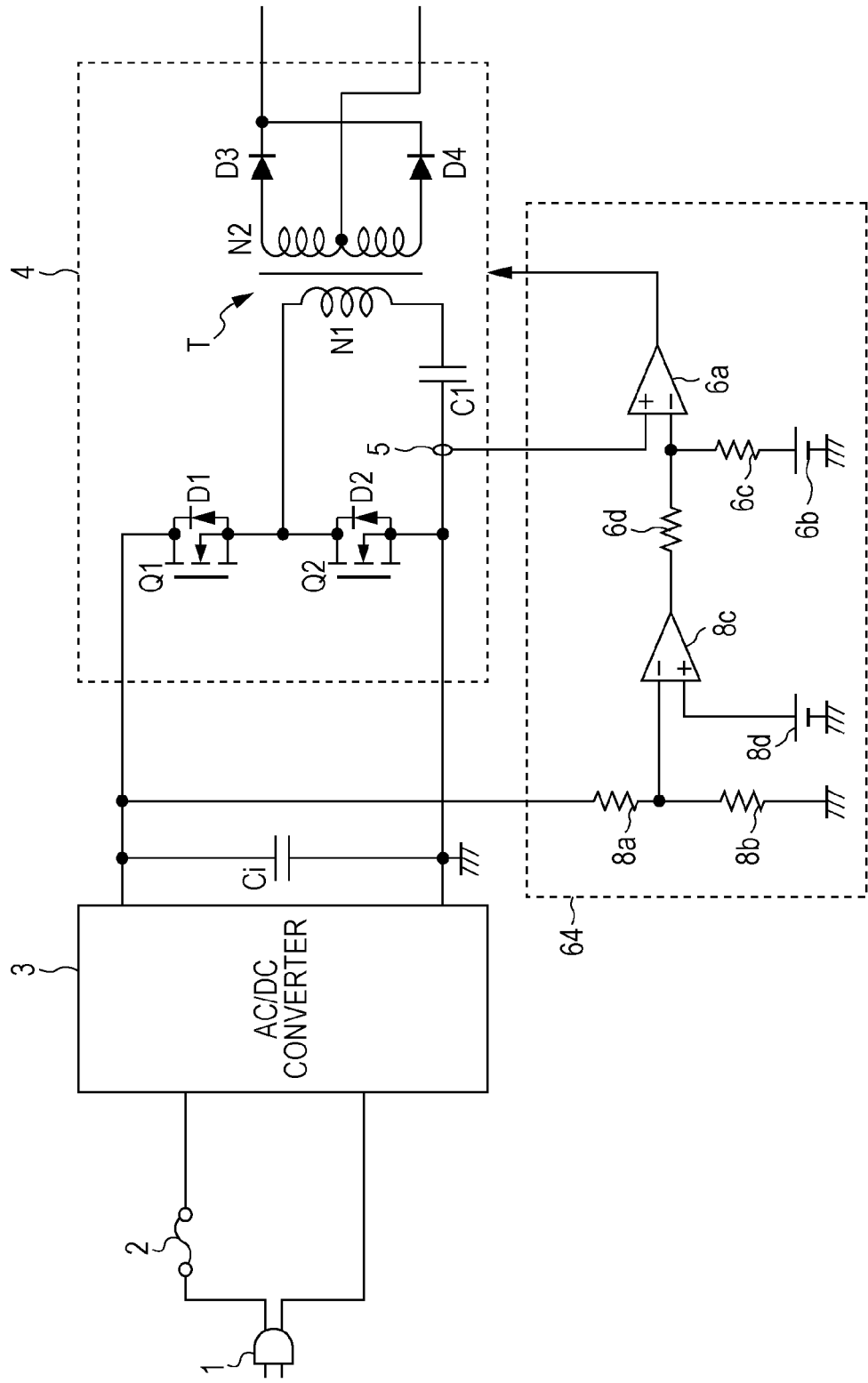
FIG. 11 is a circuit diagram showing a first example of a second embodiment.

FIG. 11 shows a first example of the overcurrent limiting circuit according to the blocking capacitor voltage detecting method.

Figure 4:
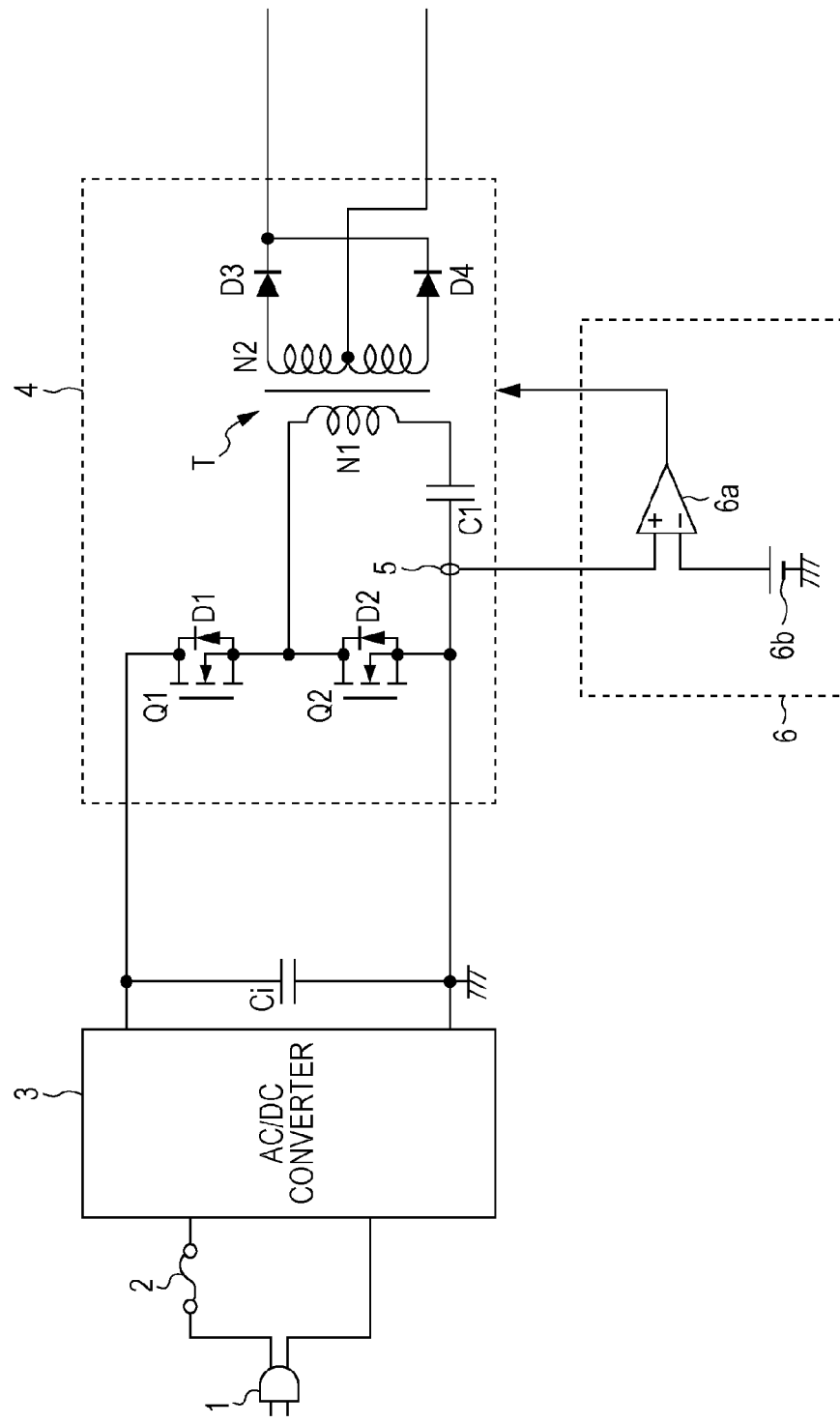
FIG. 4 is a circuit diagram used for describing an overcurrent limiting circuit of the existing switching power supply apparatus.

The configuration shown in FIG. 11 is the same as that shown in FIG. 4 except for the configuration of an overcurrent limiting circuit 64. This example has a configuration corresponding to that of the above described first example of the input voltage detecting method (Refer to FIG. 8).

One terminal of a blocking capacitor Ci is connected with the ground via resistors 8a and 8b. A voltage at the connection node between the resistors 8a and 8b is supplied to the (−) input of a comparator 8c, and is compared with a DC voltage source 8d (a threshold 8d) by a comparator 8c. The output of the comparator 8c becomes at a high level ("at a high level" will be hereinafter abbreviated to "H" accordingly) when Vin+ is larger than Vin−, and becomes at a low level ("at a low level" will be hereinafter abbreviated to "L" accordingly) when Vin− is larger than Vin+. In a normal operation state in which an input AC voltage is supplied, Vin− of the comparator 8c is larger than Vin+, therefore the output becomes L.

The output voltage of the comparator 8c is supplied to the (−) input of the comparator 6 via a resistor 6d. A series circuit composed of a resistor 6c and a threshold voltage 6b (a DC voltage supply 6b) is connected between the (−) input of the comparator 6a and the ground. When the output of the comparator 8c is L, a threshold determined by the DC voltage supply 6b, the resister 6c, and the resister 6d is supplied to the (−) input of the comparator 6a.

In this state, if a voltage obtained by converting a current detected at a current detecting point 5 exceeds the threshold, the output of the comparator 6a becomes H. Although not shown in FIG. 11, the output of the comparator 6a is supplied to an oscillator, a PMW modulator, and the like of a DC-DC converter 4, and when the output of the comparator 6a becomes H, the switching operation of FETs Q1 and Q2 is stopped. In other words, the operation of the DC-DC converter 4 is stopped and overcurrent limiting operation is performed.

If the input AC voltage is decreased or cut off, and the terminal voltage across the blocking capacitor Ci is decreased, a voltage supplied to the comparator 8c is decreased or become 0 volt, with the result that the output of the comparator 8c becomes H. Therefore, the threshold for the comparator 6a becomes higher than when the output of the comparator 8c is L. As a result, if the terminal voltage across the blocking capacitor Ci is decreased or becomes 0 volt, the threshold for the overcurrent limiting circuit 64 to operate becomes higher, and the holding time of output can be prolonged.

"Second Example of Blocking Capacitor Voltage Detecting Method"

Figure 12:
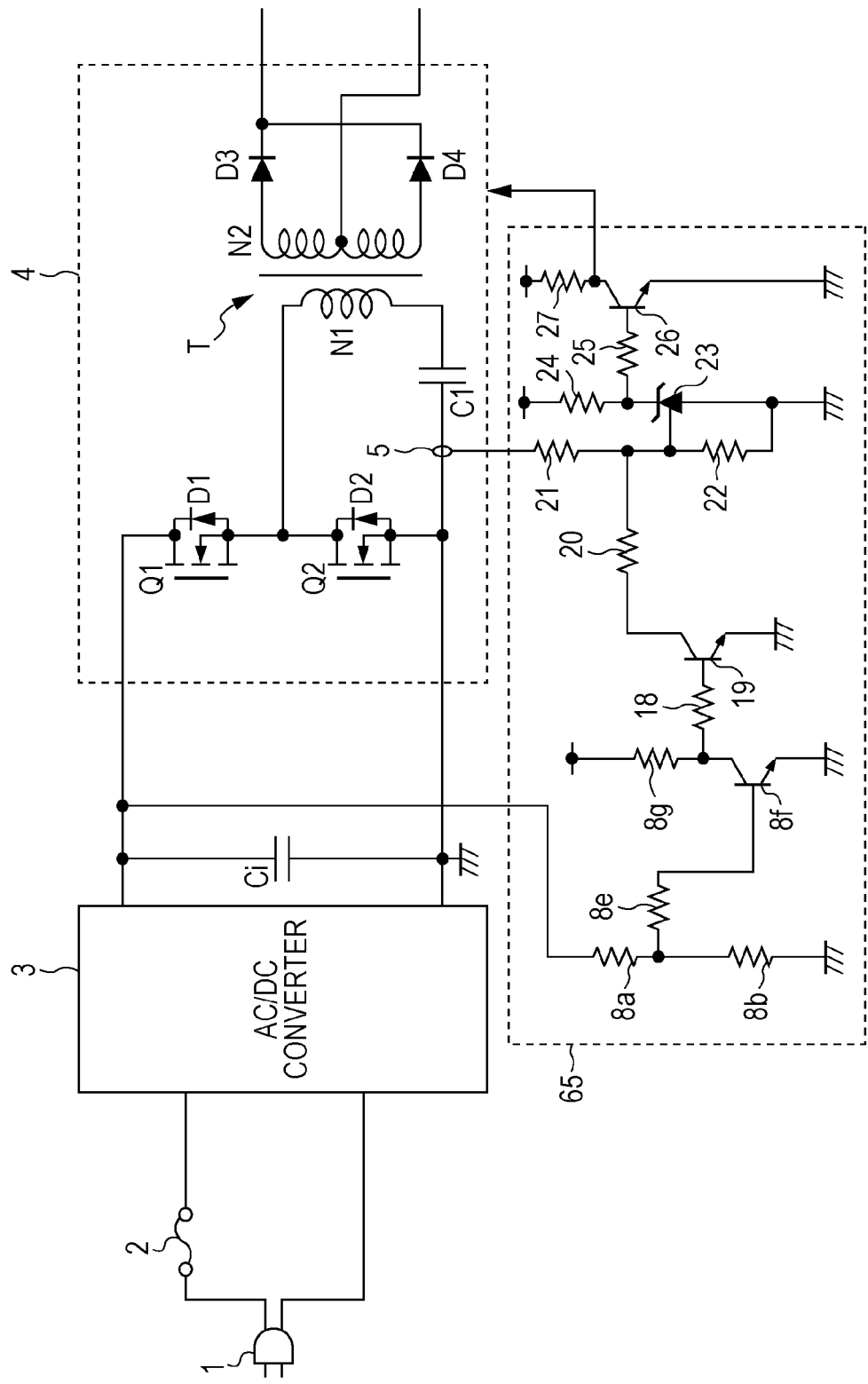
FIG. 12 is a circuit diagram showing a second example of the second embodiment.

FIG. 12 shows a second example of the overcurrent limiting circuit according to the blocking capacitor voltage detecting method. The configuration shown in FIG. 12 is the same as that shown in FIG. 4 except for the configuration of an overcurrent limiting circuit 65. This example has a configuration corresponding to that of the above described second example of the input voltage detecting method (Refer to FIG. 9).

One terminal of a blocking capacitor Ci is connected with the ground via resistors 8a and 8b. A voltage at the connection node between the resistors 8a and 8b is supplied to the base of an NPN transistor 8f. The emitter of the transistor 8f is earthed, and the collector of the transistor 8f is connected with a positive DC voltage supply line via a resistor 8g, and is also connected with the base of a transistor 19 via a resistor 18. The emitter of the transistor 19 is earthed, and the collector of the transistor 19 is connected with the connection node between a resistor 21 and a resistor 22 via a resistor 20.

A series circuit composed of the resistor 21 and the resistor 22 is disposed between a current detecting point 5 and the ground. A voltage generated at the connection node between the resistor 21 and the resistor 22 is supplied to a reference terminal of a shut regulator 23. The anode of the shunt regulator 23 is earthed, and the cathode of the shunt regulator 23 is connected with a positive DC voltage supply line via a resistor 24. In addition, the cathode of the shunt regulator 23 is connected with the base of an NPN transistor 26 via a resistor 25.

The emitter of a transistor 26 is earthed, and the collector of the transistor 26 is connected with a positive DC voltage supply line via a resistor 27. The operation of a DC-DC converter 4 is controlled by an output generated at the collector of the transistor 26. The operation of a DC-DC converter 4 is controlled in such a way that, if the output of the transistor 26 is H, the operation of the DC-DC converter 4 is stopped.

The operation of the second example of the overcurrent limiting circuit according to the blocking capacitor voltage detecting method shown in FIG. 12 is similar to that of the overcurrent limiting circuit 62 shown in FIG. 9. Therefore, the connection node between the resistors 21 and 22 becomes in a state similar to that in which the connection node is not connected with the transistor 19 via a resistor 20. In this state, the voltage at the connection node between the resistor 21 and resistor 22 is lower than the reference voltage of the shunt regulator 23, and no current flows through the shunt regulator 23. Therefore, the transistor 26 becomes ON, and the collector of the transistor 26 becomes L. In this case, overcurrent limiting operation is not performed.

When a voltage obtained by converting a current detected at the detecting point 5 becomes large, and the voltage at the connection node between the resistor 21 and resistor 22 becomes higher than the reference voltage of the shunt regulator 23, a current flows through the shunt regulator 23, thereby the transistor 26 become OFF. As a result, the collector of the transistor 26 becomes H, and the operation of the DC-DC converter 4 is stopped. In other words, the overcurrent limiting operation is performed.

If the input voltage is decreased or cut off, the transistor 8f becomes OFF, and the transistor 19 becomes ON, thereby the resistor 20 is equivalently connected in parallel with the resistor 22. As a result, because a branch path is formed by the resistor R20, the voltage at the connection node between the resistor 21 and resistor 22 becomes lower. This is equivalent to increasing the reference voltage (threshold) of the shunt regulator 23. Therefore, if the decrease or cutoff of the input voltage is generated, the holding time can be prolonged.

"Third Example of Blocking Capacitor Voltage Detecting Method"

Figure 13:
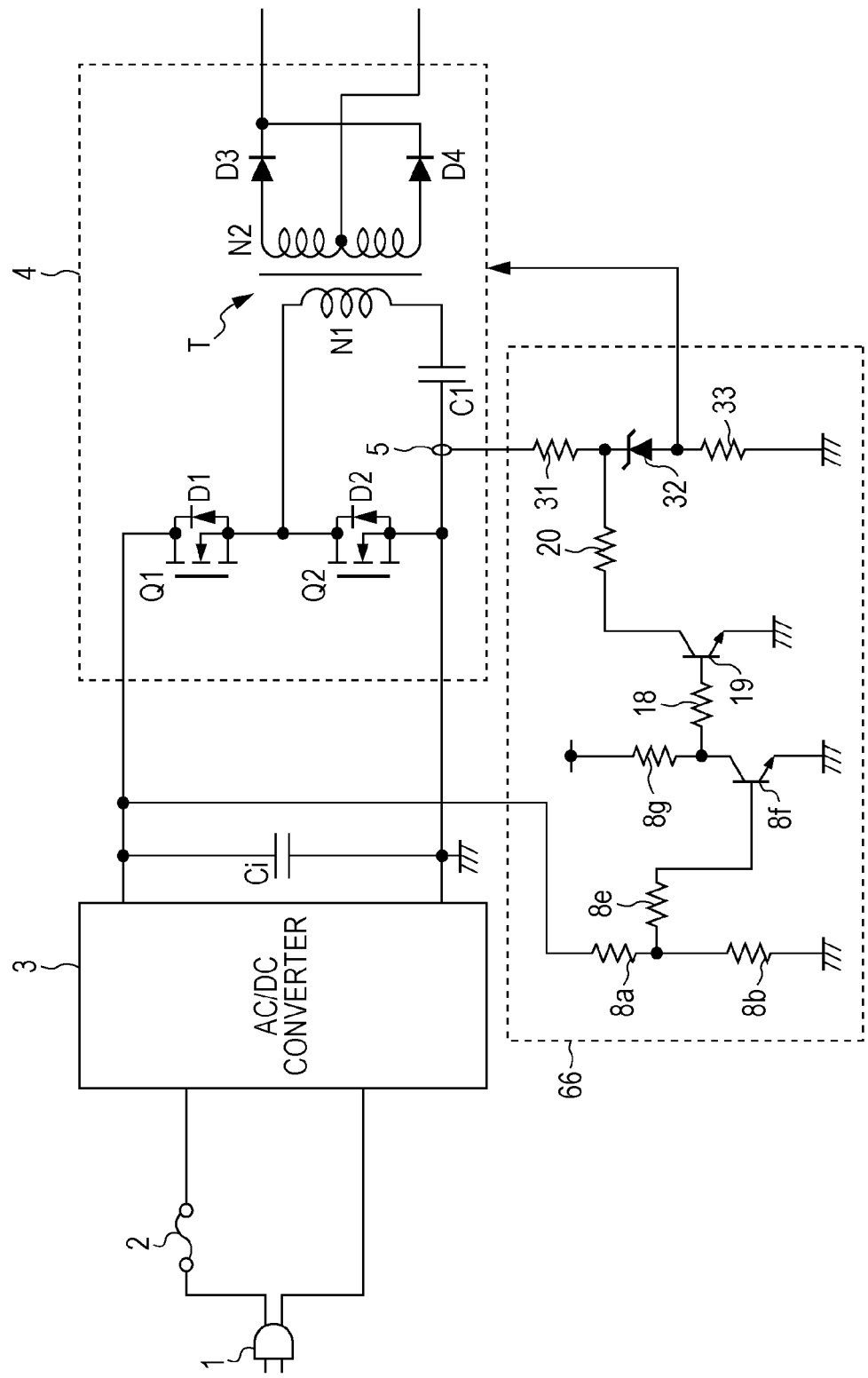
FIG. 13 is a circuit diagram showing a third example of the second embodiment.

FIG. 13 shows a third example of the overcurrent limiting circuit according to the blocking capacitor voltage detecting method. The configuration shown in FIG. 13 is the same as that shown in FIG. 4 except for the configuration of an overcurrent limiting circuit 66. This example has a configuration corresponding to that of the above described third example of the input voltage detecting method (Refer to FIG. 10).

The third example according to the blocking capacitor voltage detecting method is equipped with a zener diode 32. The cathode of the zener diode 32 is connected with a current detecting point 5 via a resistor 31, and the anode of the zener diode 32 is connected with the ground via a resistor 33. The connection node between the resistor 31 and the zener diode 32 is connected with the collector of a transistor 19 via a resistor 20. A control signal for controlling the operation of a DC-DC converter 4 is taken out from the connection node between the anode of the zener diode 32 and the resistor 33.

The operation of the third example is similar to that of the overcurrent limiting circuit 62 shown in FIG. 10. To put it concretely, when a terminal voltage across a blocking capacitor Ci is generated as intended, a transistor 19 is OFF. Therefore, the connection node between the resistor 31 and the zener diode 32 becomes in a state similar to that in which the connection node is not connected with the transistor 19 via a resistor 20. When a voltage obtained by converting a current detected at the current detecting point 5 does not exceed the zener voltage of the zener diode 32 (threshold), a control output becomes L, thereby the operation of the DC-DC converter 4 is not stopped. If the detected voltage obtained by converting a current detected at the current detecting point 5 exceeds the zener voltage (threshold) of the zener diode 32, the control signal becomes H, and the operation of the DC-DC converter 4 is stopped. In other words, overcurrent limiting operation is performed.

If the terminal voltage across the blocking capacitor Ci is decreased or becomes 0 volt, the transistor 8f becomes OFF, and the transistor 19 becomes ON, thereby a branch path is formed by the resistor R20, and the voltage applied to the zener diode 32 is lowered.

As described above, if the decrease or cutoff of the input voltage is generated, the input voltage to the zener diode 32 is lowered, thereby the holding time can be prolonged.

4. Third Embodiment

A third embodiment will be described hereinafter with reference to the attached drawings. The third embodiment uses a combination of the above described input voltage detecting method and blocking capacitor voltage detecting method. Let's refer to this method as a combination method.

"First Example of Combination Method"

Figure 14:
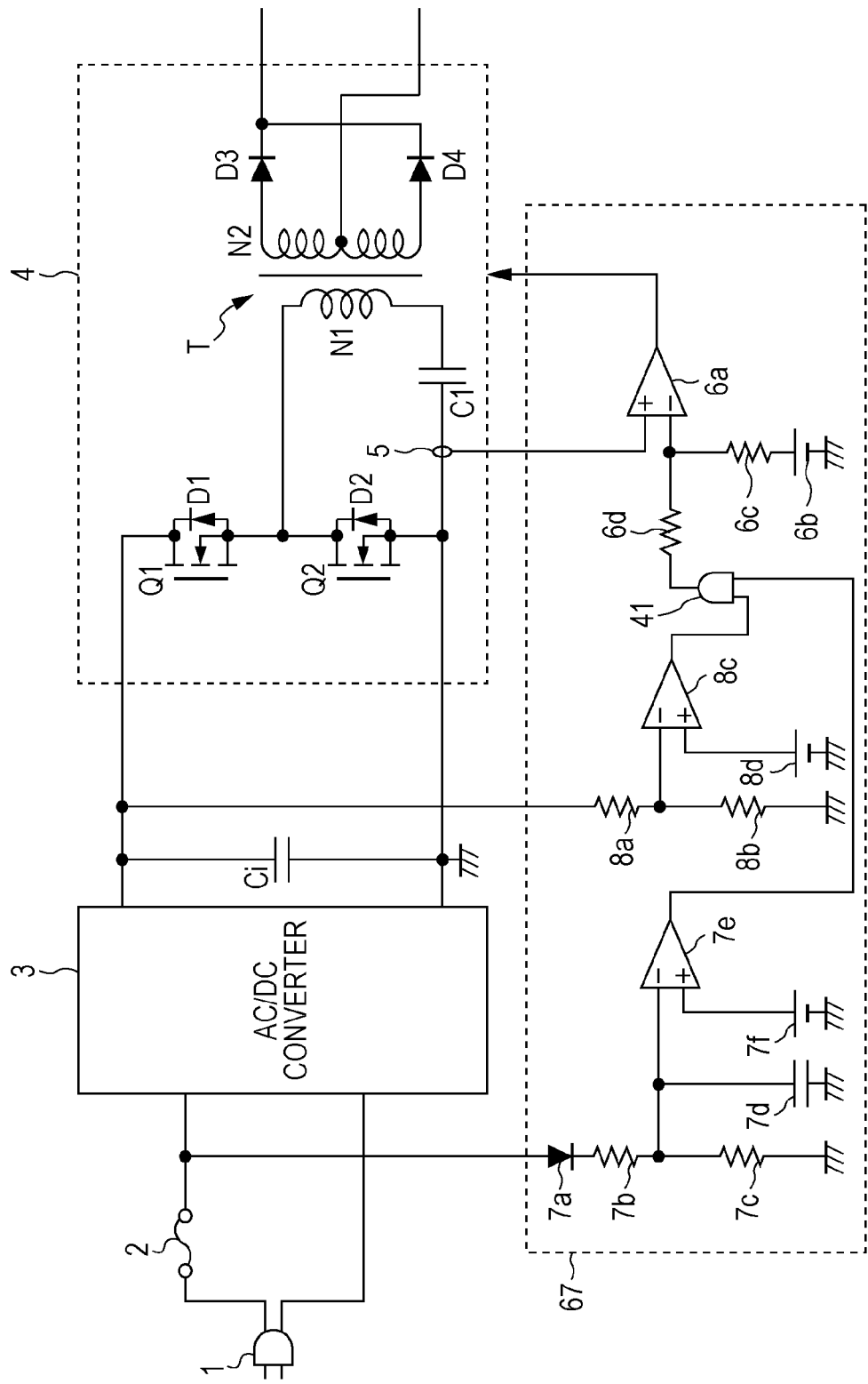
FIG. 14 is a circuit diagram showing a first example of a third embodiment.

FIG. 14 shows a first example of an overcurrent limiting circuit according to the combination method. The configuration shown in FIG. 14 is the same as that shown in FIG. 4 except for the configuration of the overcurrent limiting circuit 67. This example has a configuration corresponding to that of the above described first example of the input voltage detecting method (Refer to FIG. 8) and that of the above described first example of the blocking capacitor voltage detecting method (Refer to FIG. 11).

Components in FIG. 14 corresponding to those in FIG. 8 and FIG. 11 are given the same referential marks as those in FIG. 8 and FIG. 11 respectively. The output of a comparator 7e and output of a comparator 8c are supplied to an AND gate 41. The output of the comparator 7e becomes H when an input voltage is decreased or cut off. The output of the comparator 8c becomes H when the terminal voltage across a blocking capacitor is decreased. Therefore, when the decrease or cutoff of the input voltage and the decrease of the terminal voltage across the blocking capacitor occur at the same time, the output of the AND gate 41 becomes H.

The output of the AND gate 41 is supplied to the (−) input of a comparator 6a via a resistor 6d. When the output of the AND gate 41 is L, a threshold determined by a DC voltage supply 6b, a resistor 6c and the resistor 6d is supplied to the (−) input of the comparator 6a. When the output of the AND gate 41 is H, the threshold for the comparator 6a becomes higher than when the output of the AND gate 41 is L. As a result, if the decrease or cutoff of the input AC voltage, and the decrease of the terminal voltage across the blocking capacitor occur at the same time, the threshold for the overcurrent limiting circuit 67 becomes higher, and the holding time of output can be prolonged.

"Second Example of Combination Method"

Figure 15:
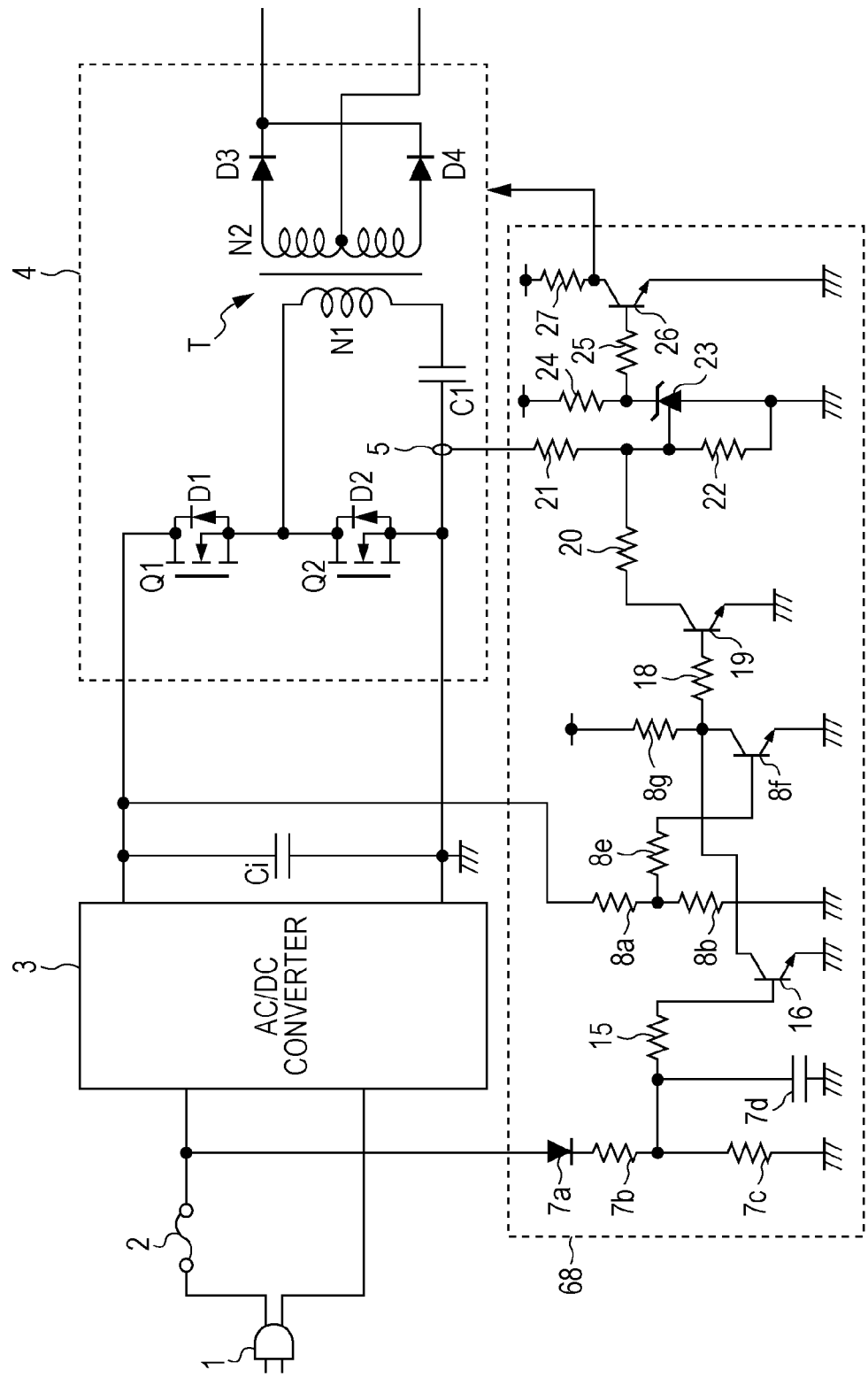
FIG. 15 is a circuit diagram showing a second example of the third embodiment.

FIG. 15 shows a second example of an overcurrent limiting circuit according to the combination method.

The configuration shown in FIG. 15 is the same as that shown in FIG. 4 except for the configuration of the overcurrent limiting circuit 68. This example has a configuration corresponding to that of the above described second example of the input voltage detecting method (Refer to FIG. 9) and that of the above described second example of the blocking capacitor voltage detecting method (Refer to FIG. 12).

Components in FIG. 15 corresponding to those in FIG. 9 and FIG. 12 are given the same referential marks as those in FIG. 9 and FIG. 12 respectively. A configuration on the reference terminal side of a shunt regulator 23 (composed of a transistor 19, resistors 18, 20, 21, and 22), and a configuration on the input/output side of a shunt regulator 23 (composed of a transistor 26, resistors 24, 25, and 27) of this example is common to both second example of the input voltage detecting method, and second example of the blocking capacitor voltage detecting method.

In the second example of the input voltage detecting method, if an input voltage is decreased or cut off, a transistor 16 becomes OFF. In the second example of the blocking capacitor voltage detecting method, if a voltage across a blocking capacitor is decreased, a transistor 8f becomes OFF. Therefore, in the case where the collector of the transistor 16 and the collector of the transistor 8f are connected with each other, a voltage applied to the base of a transistor 19 is H only when both transistors 16 and 8f are OFF.

Therefore, only when both decrease or cutoff of the input voltage, and decrease of the terminal voltage across the blocking capacitor occur at the same time, the transistor 19 becomes ON, thereby the resistor 20 and the resistor 22 are connected in parallel. As a result, because a branch path is formed by the resistor R20, the voltage at the connection node between the resistor 21 and resistor 22 becomes lower. Lowering the input voltage to the shunt regulator 23 is equivalent to increasing the reference voltage (threshold) of the shunt regulator 23. As a result, if the decrease or cutoff of the input AC voltage, and the decrease of the terminal voltage across the blocking capacitor occur at the same time, the holding time of output can be prolonged.

"Third Example of Combination Method"

Figure 16:
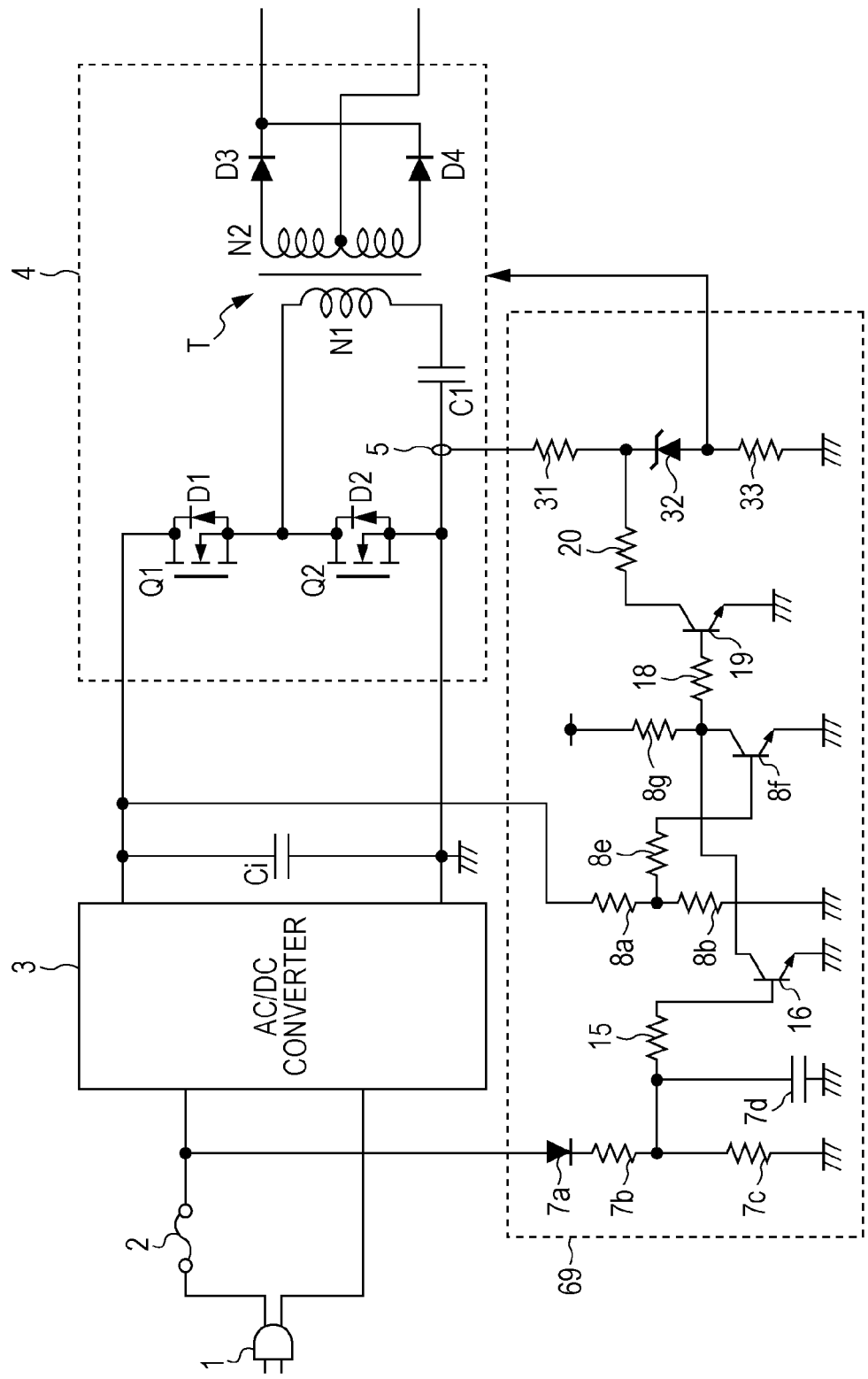
FIG. 16 is a circuit diagram showing a third example of the third embodiment.

FIG. 16 shows a third example of an overcurrent limiting circuit according to the combination method.

The configuration shown in FIG. 16 is the same as that shown in FIG. 4 except for the configuration of the overcurrent limiting circuit 69. This example has a configuration corresponding to that of the above described third example of the input voltage detecting method (Refer to FIG. 10) and that of the above described third example of the blocking capacitor voltage detecting method (Refer to FIG. 13).

Components in FIG. 16 corresponding to those in FIG. 10 and FIG. 13 are given the same referential marks as those in FIG. 10 and FIG. 13 respectively. A configuration regarding a zener diode 32 (composed of a transistor 19, resistors 18, 20, 31, and 33) is common to both third example of the input voltage detecting method, and third example of the blocking capacitor voltage detecting method.

In the third example of the input voltage detecting method, if an input voltage is decreased or cut off, a transistor 16 becomes OFF. In the third example of the blocking capacitor voltage detecting method, if a voltage across a blocking capacitor is decreased, a transistor 8*f* becomes OFF. Therefore, in the case where the collector of the transistor 16 and the collector of the transistor 8*f* are connected with each other, a voltage applied to the base of a transistor 19 is H only when both transistors 16 and 8*f* are OFF.

Therefore, only when both decrease or cutoff of the input voltage, and decrease of the terminal voltage across the blocking capacitor occur at the same time, the transistor 19 becomes ON, thereby a branch path is formed by the resistor 20, and the voltage applied to the zener diode 32 is lowered. Lowering the voltage applied to the zener diode 32 is equivalent to increasing the zener voltage of the zener diode 32 (threshold). As a result, if the decrease or cutoff of the input AC voltage, and the decrease of the terminal voltage across the blocking capacitor occur at the same time, the holding time of output can be prolonged.

5. Modifications

Although the present application has been concretely described in three embodiments and their examples, the present application is not limited to these embodiments and examples, and a variety of modifications may be made on the basis of the technical ideas. For example, in the above-described combination method, the threshold is changed with the use of and operation of the output of the input voltage detecting method and output of the blocking capacitor voltage detecting method. However the threshold can be changed with the use of OR operation of both outputs. In addition, it is conceivable that a switching power supply circuit other than the above-described current resonant converter is used as a DC-DC converter.

It should be understood that various changes and modifications to the presently preferred embodiments described herein will be apparent to those skilled in the art. Such changes and modifications can be made without departing from the spirit and scope and without diminishing its intended advantages. It is therefore intended that such changes and modifications be covered by the appended claims.

The application is claimed as follows:

1. A switching power supply apparatus comprising:
   a switching DC-DC converter for receiving an input voltage;
   a current detecting unit for detecting a current from the DC-DC converter;
   an input voltage detecting unit for detecting the decrease or cutoff of the input voltage;
   an overcurrent limiting circuit for stopping the operation of the DC-DC converter when the current detected by the current detecting unit exceeds a threshold; and
   a threshold control unit for changing the threshold of the overcurrent limiting circuit such that, if the decrease or cutoff of the input voltage is detected by the input voltage detecting unit, the period between the time when the decrease or cutoff of the input voltage is detected and the time when the operation of the DC-DC converter is stopped is prolonged.

2. The switching power supply apparatus according to claim 1, further comprising an AC/DC converter in front of the DC-DC converter, wherein
   the input voltage detecting unit detects the decrease or cutoff of an AC voltage supplied to the AC/DC converter.

3. The switching power supply apparatus according to claim 1, further comprising a smoothing capacitor in front of the DC-DC converter, wherein
   the input voltage detecting unit detects the decrease of a terminal voltage across the smoothing capacitor.

4. The switching power supply apparatus according to claim 1, wherein
   the overcurrent limiting circuit includes a comparator for comparing the current detected by the current detecting unit, or a voltage obtained by converting the current with a threshold, and
   the threshold control unit changes the threshold.

5. The switching power supply apparatus according to claim 1, wherein
   the overcurrent limiting circuit includes a shunt regulator to the reference terminal of which the current detected by the current detecting unit, or a voltage obtained by converting the current is supplied, and
   the threshold control unit changes the value of the voltage supplied to the reference terminal.

6. The switching power supply apparatus according to claim 1, wherein
   the overcurrent limiting circuit includes a zener diode to the cathode of which the current detected by the current detecting unit, or a voltage obtained by converting the current is supplied, and
   the threshold control unit changes the value of the voltage supplied to the cathode.

* * * * *